US008296753B2

(12) United States Patent
Murata

(10) Patent No.: US 8,296,753 B2
(45) Date of Patent: Oct. 23, 2012

(54) UPGRADE SERVICE SYSTEM

(75) Inventor: Kuniharu Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 1030 days.

(21) Appl. No.: 11/929,135

(22) Filed: Oct. 30, 2007

(65) Prior Publication Data

US 2008/0104584 A1    May 1, 2008

(30) Foreign Application Priority Data

Nov. 1, 2006   (JP) ................. 2006-298188

(51) Int. Cl.
G06F 9/44    (2006.01)

(52) U.S. Cl. ........ 717/168; 717/171; 717/172; 717/176; 717/177; 713/191

(58) Field of Classification Search .................. 717/171, 717/173, 178, 176, 172, 177; 340/4.42; 348/270; 380/278; 713/191
See application file for complete search history.

(56) References Cited

U.S. PATENT DOCUMENTS

| | | | | |
|---|---|---|---|---|
| 5,725,559 A | * | 3/1998 | Alt et al. ............................ | 607/5 |
| 5,790,664 A | * | 8/1998 | Coley et al. ................... | 709/203 |
| 5,799,086 A | * | 8/1998 | Sudia .............................. | 705/76 |
| 5,841,865 A | * | 11/1998 | Sudia ............................ | 380/286 |
| 5,850,451 A | * | 12/1998 | Sudia ............................ | 380/286 |
| 5,857,022 A | * | 1/1999 | Sudia ............................ | 713/173 |
| 5,872,849 A | * | 2/1999 | Sudia ............................ | 713/175 |
| 6,009,177 A | * | 12/1999 | Sudia ............................ | 713/191 |
| 6,532,543 B1 | * | 3/2003 | Smith et al. .................... | 726/14 |
| 6,732,106 B2 | * | 5/2004 | Okamoto et al. .............. | 707/784 |
| 6,950,941 B1 | * | 9/2005 | Lee et al. ....................... | 713/193 |
| 7,024,553 B1 | * | 4/2006 | Morimoto ....................... | 713/163 |
| 7,496,756 B2 | * | 2/2009 | Oka et al. ....................... | 713/175 |
| 7,761,866 B2 | * | 7/2010 | Abe et al. ....................... | 717/173 |
| 7,936,878 B2 | * | 5/2011 | Kune et al. .................... | 380/270 |
| 8,001,529 B2 | * | 8/2011 | Babut et al. ................... | 717/124 |
| 2002/0073102 A1 | * | 6/2002 | Okamoto et al. .............. | 707/200 |
| 2002/0124168 A1 | | 9/2002 | McCown et al. | |
| 2003/0023559 A1 | * | 1/2003 | Choi et al. ....................... | 705/51 |
| 2003/0061170 A1 | * | 3/2003 | Uzo ................................ | 705/64 |
| 2004/0158707 A1 | * | 8/2004 | Kim .............................. | 713/153 |
| 2005/0004873 A1 | * | 1/2005 | Pou et al. ......................... | 705/51 |
| 2005/0027657 A1 | | 2/2005 | Leontiev et al. | |
| 2005/0049976 A1 | | 3/2005 | Yang | |

(Continued)

FOREIGN PATENT DOCUMENTS

EP    1521395 A1    4/2005

(Continued)

OTHER PUBLICATIONS

Yau et al., "A Digital Rights Management System for e-Content", 2004.*

(Continued)

*Primary Examiner* — Phillip H Nguyen

(57) ABSTRACT

A wireless apparatus or the like downloads upgrade content information and an upgrade key generated from a production number of the user apparatus which are generated by an upgrade key support center apparatus to perform upgrading, and the upgrade key support center apparatus periodically acquires apparatus information of the wireless apparatus or the like to monitor whether illegal upgrading is not performed. This makes it possible to easily manage a wireless apparatus which can perform an increase/decrease in capacity, selection of redundancy, change of functions, and the like by using an upgrade key.

1 Claim, 9 Drawing Sheets

U.S. PATENT DOCUMENTS

2005/0071839 A1* 3/2005 Kim et al. .................. 717/170
2005/0154908 A1* 7/2005 Okamoto .................. 713/193
2005/0159885 A1* 7/2005 Nomura .................. 701/208

FOREIGN PATENT DOCUMENTS

| JP | 2000163488 | A | 6/2000 |
| JP | 2002111894 | A | 4/2002 |
| JP | 2004046320 | | 2/2004 |
| JP | 2006277527 | A | 10/2006 |

OTHER PUBLICATIONS

Mahmud et al., "Secure Software Upload in an Intelligent Vehicle via Wireless Communication Links", 2005, IEEE.*
Farnham et al., "A perspective on the Reconfiguration of Future Mobile Terminals using Software Download", 2000, IEEE.*
EP Office Action for EP07119314.8 mailed on Jun. 20, 2012.

* cited by examiner

FIG. 2

KEY FOR INCREASE / DECREASE IN CAPACITY AND SELECTION OF REDUNDANCY UPGRADE KEY IS GENERATED BY COMBINATION OF THE FOLLOWING BEFORE-CHANGE KEY AND AFTER-CHANGE KEY.

BEFORE-CHANGE KEY

| |
|---|
| 10MB1+0 |
| 20MB1+0 |
| 40MB1+0 |
| 80MB1+0 |
| 100MB1+0 |
| 156MB1+0 |
| 10MB1+1 |
| 20MB1+1 |
| 40MB1+1 |
| 80MB1+1 |
| 100MB1+1 |
| 156MB1+1 |

AFTER-CHANGE KEY

| |
|---|
| 10MB1+0 |
| 20MB1+0 |
| 40MB1+0 |
| 80MB1+0 |
| 100MB1+0 |
| 156MB1+0 |
| 10MB1+1 |
| 20MB1+1 |
| 40MB1+1 |
| 80MB1+1 |
| 100MB1+1 |
| 156MB1+1 |

EXAMPLE 1
EXAMPLE 2

EXAMPLE 1 : UPGRADE KEY IS "20MB1 + 0 TO 80MB1 + 0"
EXAMPLE 2 : UPGRADE KEY IS "40MB1 + 0 TO 40MB1 + 1"
THERE ARE 132 UPGRADE KEYS FOR INCREASE / DECREASE IN CAPACITY AND SELECTION OF REDUNDANCY IN TOTAL.

F I G. 3

SELECTION KEY FOR DETERMINING WHETHER TRANSMISSION CAPACITY IS MADE VARIABLE OR FIXED

| BEFORE CHANGE / AFTER CHANGE | FIXED TRANSMISSION CAPACITY | VARIABLE TRANSMISSION CAPACITY |
|---|---|---|
| FIXED TRANSMISSION CAPACITY |  | FIXED TRANSMISSION CAPACITY →<br>VARIABLE TRANSMISSION CAPACITY |
| VARIABLE TRANSMISSION CAPACITY | VARIABLE TRANSMISSION CAPACITY →<br>FIXED TRANSMISSION CAPACITY |  |

SELECTION KEY FOR DETERMINING WHETHER LAN INTERFACE IS MADE VALID OR INVALID

| BEFORE CHANGE / AFTER CHANGE | LAN IS VALID | LAN IS INVALID |
|---|---|---|
| LAN IS VALID |  | LAN IS VALID → LAN IS INVALID |
| LAN IS INVALID | LAN IS INVALID → LAN IS VALID |  |

SELECTION KEY FOR DETERMINING WHETHER XPIC FUNCTION IS MADE VALID OR INVALID

| BEFORE CHANGE / AFTER CHANGE | XPIC FUNCTION IS VALID | XPIC FUNCTION IS INVALID |
|---|---|---|
| XPIC FUNCTION IS VALID |  | XPIC FUNCTION IS VALID →<br>XPIC FUNCTION IS INVALID |
| XPIC FUNCTION IS INVALID | XPIC FUNCTION IS INVALID →<br>XPIC FUNCTION IS VALID |  |

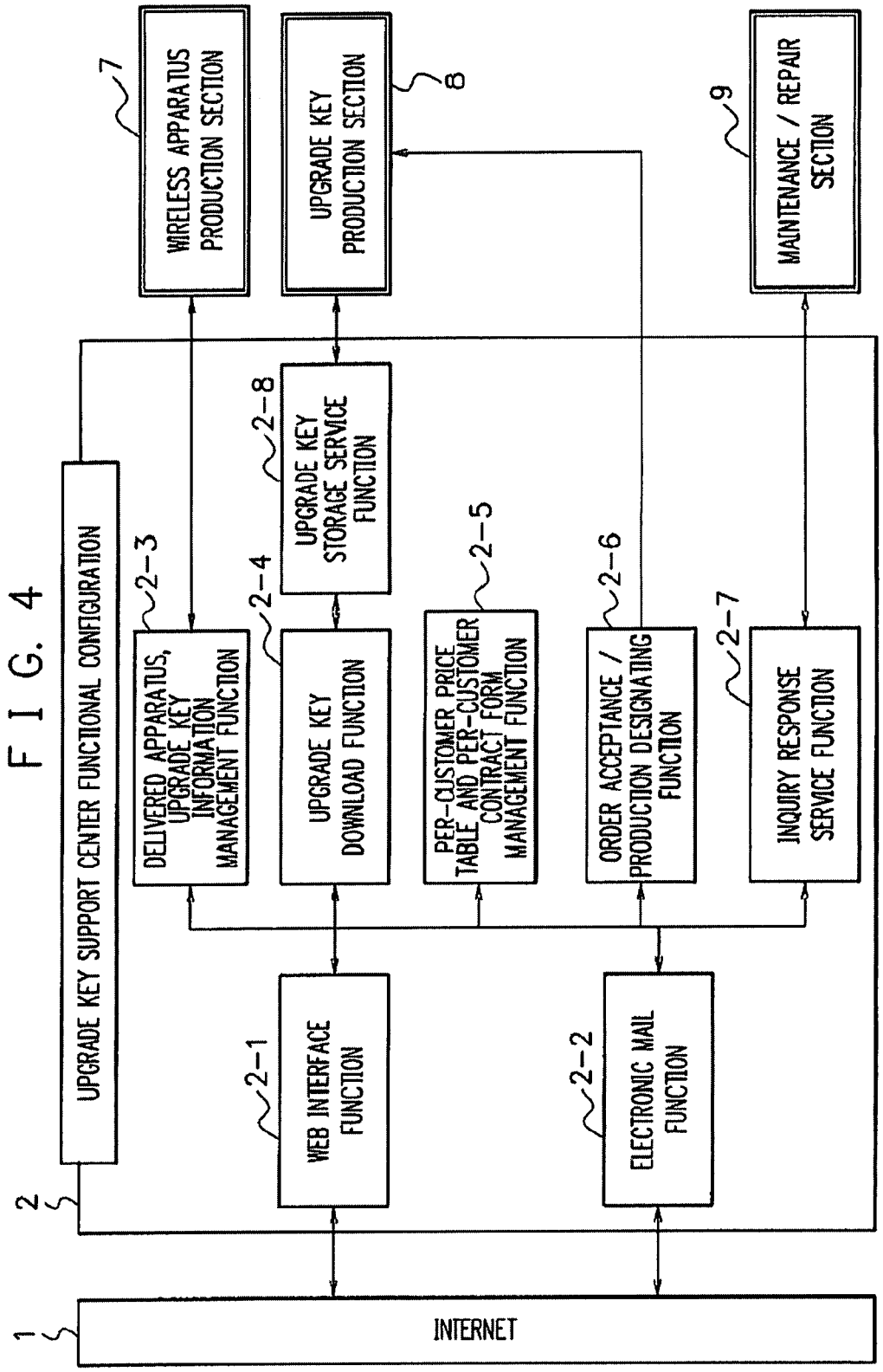

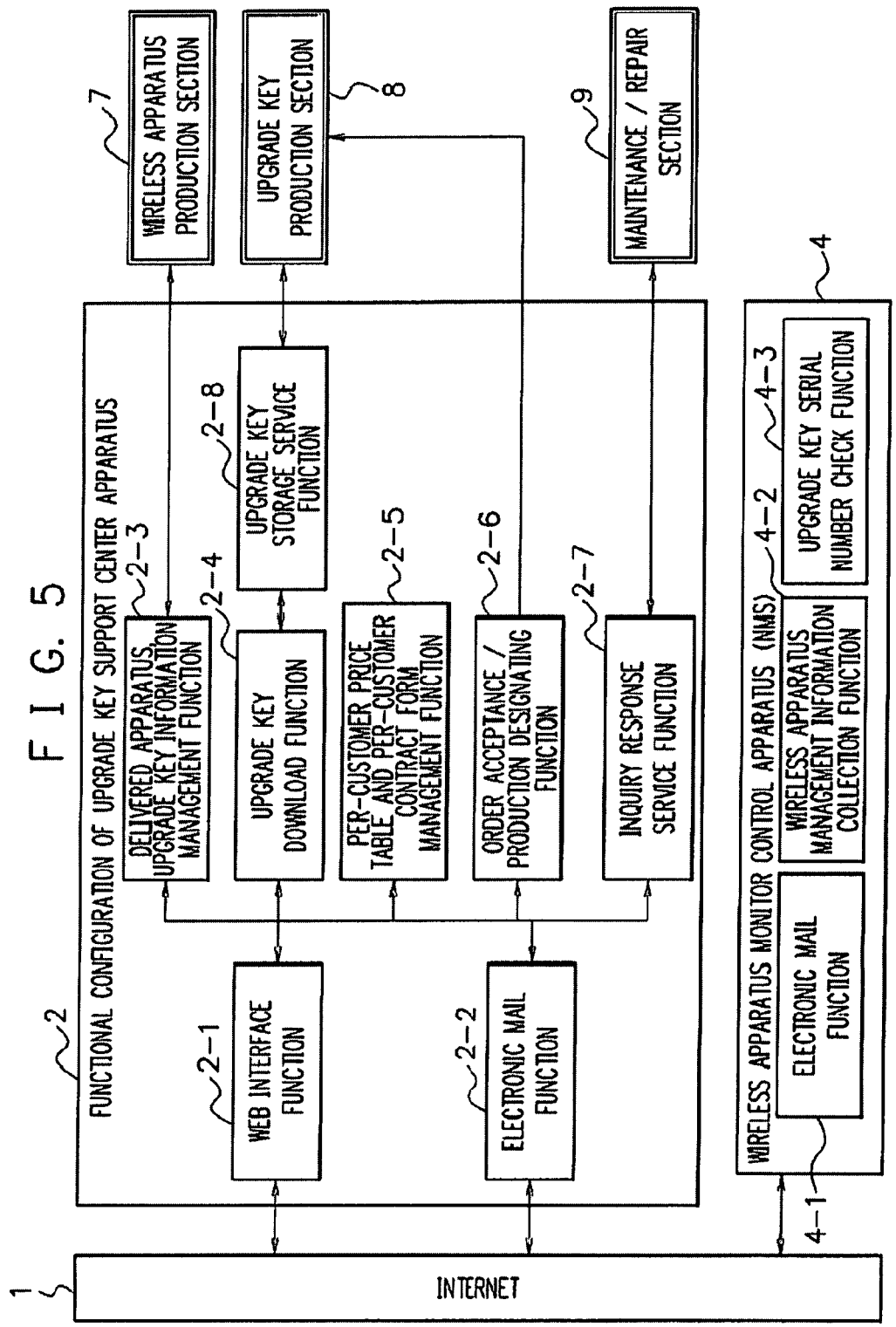

FIG. 7

| BEFORE CHANGE \ AFTER CHANGE | 10MB1+0 | 20MB1+0 | 40MB1+0 | 80MB1+0 | 100MB1+0 | 156MB1+0 |
|---|---|---|---|---|---|---|
| 10MB1+0 | | ■ | | | | |
| 20MB1+0 | ■ | | | ■ (SELECTION BUTTON: 20MB1+0 → 80MB1+0) | ■ | ■ |
| 40MB1+0 | | | ■ | ■ | ■ | ■ |
| 80MB1+0 | | | | | | |
| 100MB1+0 | | | | | | |
| 156MB1+0 | | | | | | |

F I G. 8
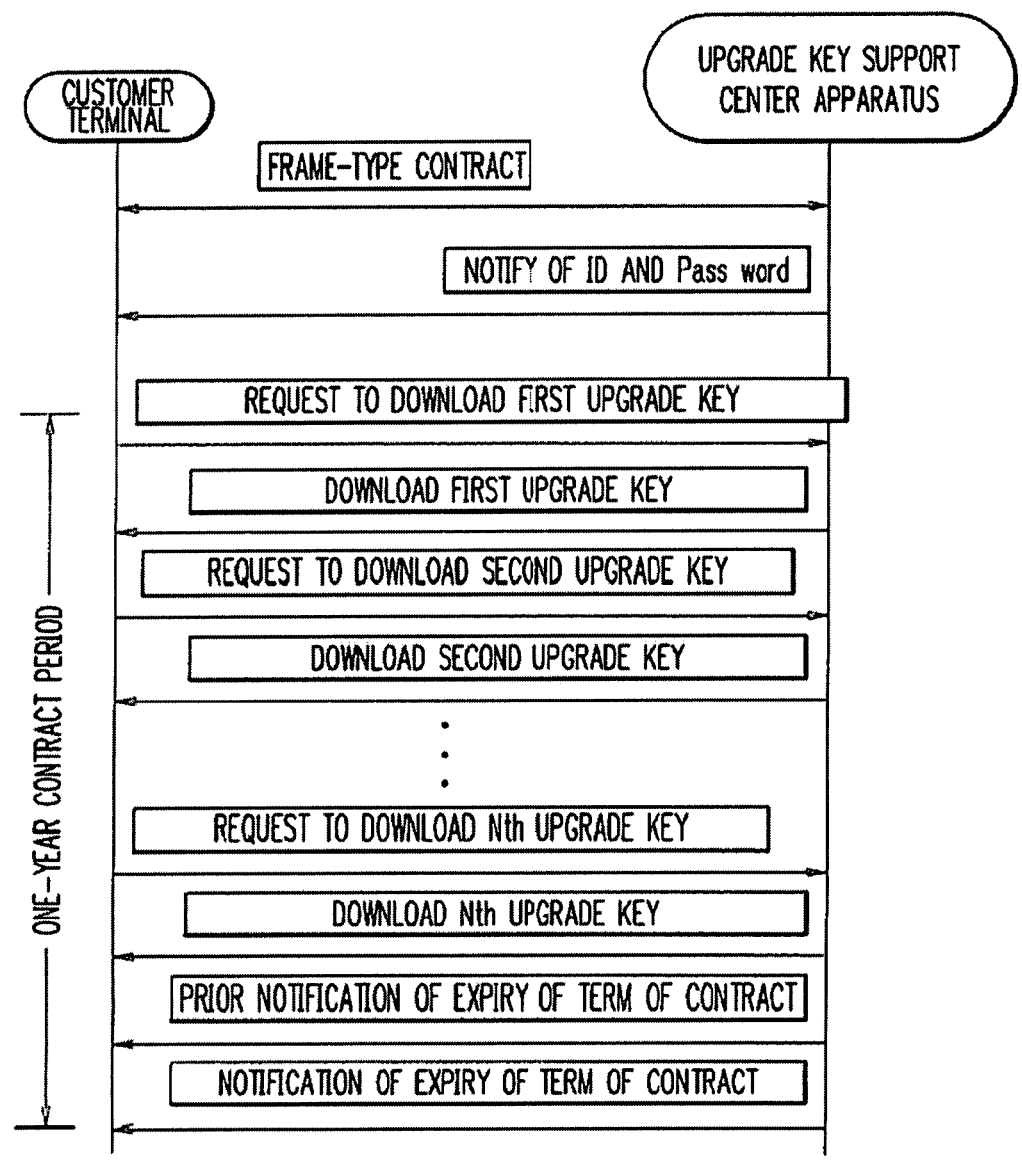

UPGRADE SERVICE SYSTEM

This application is based upon and claims the benefit of priority from Japanese patent application No. 2006-298188, filed on Nov. 1, 2006, the disclosure of which is incorporated herein in its entirety by reference.

BACKGROUND OF THE INVENTION

1. Field of the Invention

The present invention relates to a technique which manages a user apparatus corresponding to a delivered upgrade key.

2. Description of Related Art

A wireless apparatus corresponding to a delivered upgrade key is not easily traced after shipping, and a management service cannot be provided. More specifically, until now, in changes of functions such as capacity, redundant configuration, bit rate, LAN, and XPIC, CDs are independently manufactured for customers in accordance with contracts with the customers and then shipped.

A wireless apparatus of this type is outrightly sold, and a provision of a management service after shipping (delivered) has not been considered. For this reason, there is no system for managing information.

In this case, as a prior art, Japanese Patent Application National Publication No. 2004-46320 (Patent Document 1) discloses a technique enabling a provision of the following peripheral device upgrade service system. That is, when a user accesses a server of a sales system through a PC, peripheral device information detecting means serving as an application program started in the PC of the user acquires PC hardware information including a memory capacity of the PC, types and the number of connectors, or peripheral device information of peripheral devices connected to the PC, and notifies the server of the sales system of the hardware information. On the server side of the sales system, a peripheral device which can be installed by the user and can be upgraded for the existing peripheral devices is listed from a database based on the acquired hardware information. The server notifies each user of the listed peripheral device through a homepage, an electronic mail, or the like of the user to make it possible to efficiently perform an upgrade service for the peripheral devices of the user terminal.

Problems of the prior art will be described below.

A customer cannot purchase/acquire an upgrade key through the Internet.

According to the apparatus of this type, in order to provide an upgrade key, the upgrade key is manufactured and delivered in the form of a CD. A customer who purchases the CD delivers the CD to a site (place where a wireless apparatus is installed) and connects a PC to the apparatus, and writes data to the apparatus through the CD.

Delivering of the upgrade key in the form of a CD requires a conveyance procedure and a time for conveyance. So, long time is required until the upgrade key is conveyed to a final destination and installed in the wireless apparatus.

Moreover, for the form of a CD, the upgrade key cannot be freely acquired at any time and from any location within a short period of time.

Since a location where a wireless apparatus is installed is generally unpeopled, a destination of the CD is generally different from the location where the wireless apparatus is installed. For this reason, the customer must receive the CD and then resend the CD to the site or causes someone to carry the CD to the site.

Furthermore, a production number of the wireless apparatus which is required when the upgrade key is purchased cannot be managed. Thus, a new upgrade key can be ordered only after confirmation of the production number of the corresponding wireless apparatus and check of a state of a key currently set.

In a management for each customer, only a single response is performed in contract or delivery, resulting in failing to provide series and continuous management, so a close support service cannot be provided to each customer.

Moreover, managements cannot be performed such as estimation, purchase, an installation operation, a test, an operation, maintenance, repair, a change, and disposal, over the life cycle of a wireless apparatus.

SUMMARY OF THE INVENTION

An exemplary object of the invention is to provide a user apparatus, a server, an upgrade service system, and a method and a program or a computer-readable medium storing the program thereon, which employ an upgrade key to make it easy to manage a wireless apparatus which performs an increase/decrease in capacity, selection of redundancy, a change of functions, and the like.

[Upgrade Service System]

An upgrade service system according to an exemplary aspect of the invention is characterized in that a user apparatus downloads upgrade content information and an upgrade key generated from a production number of the user apparatus through a server to perform upgrading, and the server periodically acquires apparatus information of the user apparatus and collates the upgrade content information with an upgrade key database in which the production number of the user apparatus and the upgrade key are stored in association with each other to thereby monitor whether illegal upgrade is not performed.

[User Apparatus]

A user apparatus according to an exemplary aspect of the invention is characterized in that a server downloads upgrade content information and an upgrade key generated from a production number of the user apparatus to perform upgrading, and the server periodically acquires apparatus information of the user apparatus and collates the upgrade content information with an upgrade key database in which the production number of the user apparatus and the upgrade key are stored in association with each other so that whether illegal upgrade is not performed is monitored.

[Server]

A server according to an exemplary aspect of the invention is characterized in that upgrade content information and an upgrade key generated from a production number of a user apparatus are downloaded on the user apparatus to perform upgrading, apparatus information of the user apparatus is periodically acquired, and the upgrade content information is collated with an upgrade key database in which the production number of the user apparatus and the upgrade key are stored in association with each other to thereby monitor whether illegal upgrade is not performed.

[Upgrade Service Method]

An upgrade service method according to an exemplary aspect of the invention is characterized in that a user apparatus downloads upgrade content information and an upgrade key generated from a production number of the user apparatus through a server to perform upgrading, and the server periodically acquires apparatus information of the user apparatus and collates the upgrade content information with an upgrade key database in which the production number of the user apparatus and the upgrade key are stored in association with each other to thereby monitor whether illegal upgrade is not performed.

[Program]

A program according to an exemplary aspect of the invention causes a computer to perform processes of downloading upgrade content information and an upgrade key generated from a production number of a user apparatus to perform upgrading, periodically acquiring apparatus information of the user apparatus, and collating the upgrade content information with an upgrade key database in which the production number of the user apparatus and the upgrade key are stored in association with each other to thereby achieve the processing for monitoring whether illegal upgrade is not performed.

BRIEF DESCRIPTION OF THE DRAWINGS

Features of the disclosed embodiments will be described by way of the following detailed description with reference to the accompanying drawings in which:

FIG. 2 is a diagram showing types of upgrade keys according to the embodiment of the invention;

FIG. 3 is a diagram showing types of upgrade keys according to the embodiment of the invention;

FIG. 4 is a diagram showing a functional configuration of an upgrade key support center apparatus according to the embodiment of the invention;

FIG. 5 is a functional block diagram including an NMS according to the embodiment of the invention;

FIG. 7 is a diagram showing a matrix according to the embodiment of the invention;

FIG. 8 is a chart showing a service flow in an frame-type contract according to the embodiment of the invention.

DESCRIPTION OF EXEMPLARY EMBODIMENTS

Exemplary embodiments of the present invention will be described below in detail with reference to the accompanying drawings.

Figure 1:
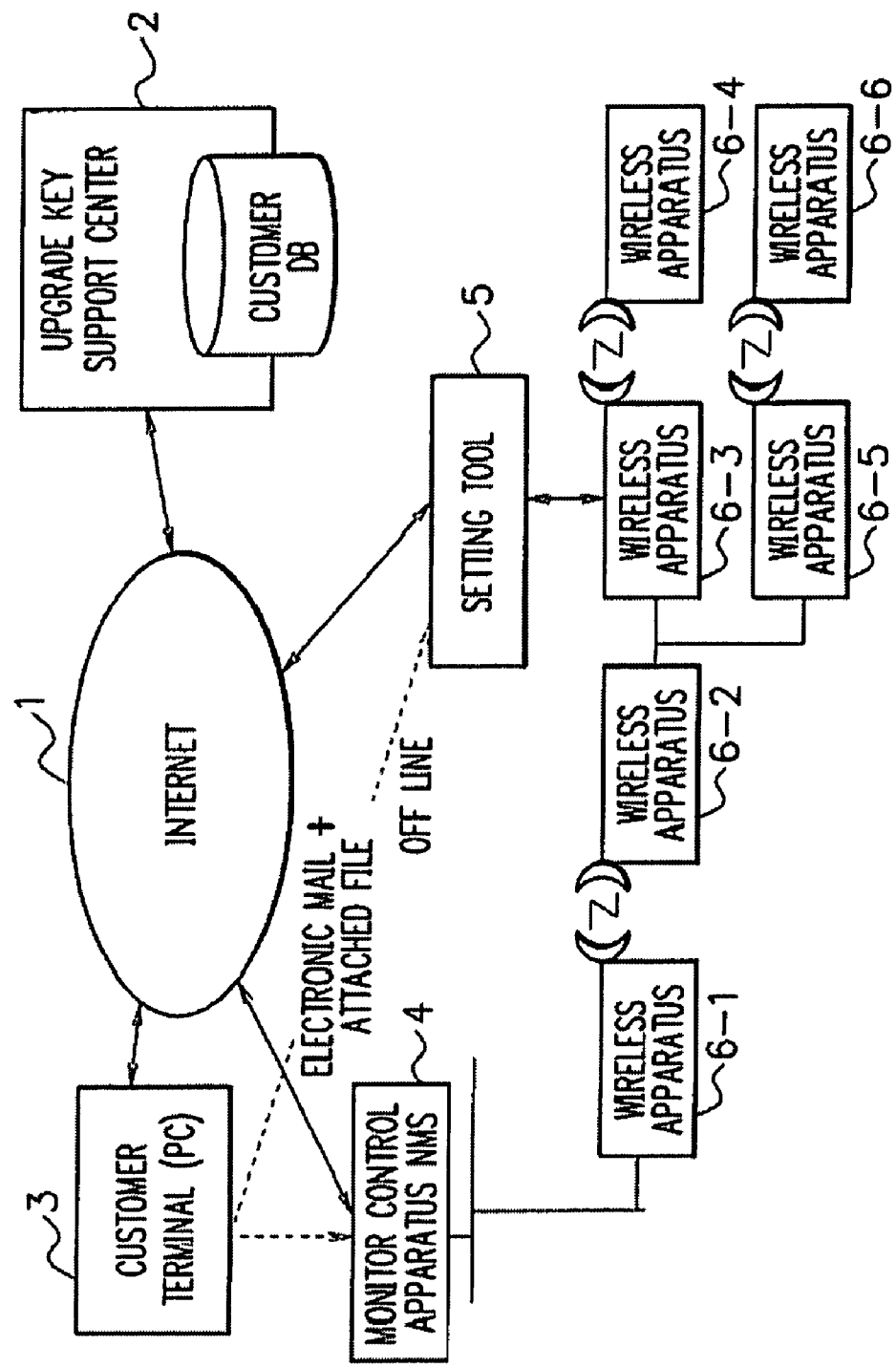
FIG. 1 is a diagram showing a configuration of an upgrade service system according to an embodiment of the present invention.

FIG. 1 shows an entire configuration of an upgrade service system according to an exemplary embodiment.

Reference numeral 1 denotes the Internet; 2 denotes an upgrade key support center apparatus; 3 denotes a customer terminal (PC) by which a customer accesses the Internet; 4 denotes a wireless apparatus monitoring apparatus (NMS); 5 denotes a tool which is directly connected to a wireless apparatus operated by an Windows (tradename) PC to download an upgrade key; and 6-1 to 6-6 denote wireless apparatuses whose capacities and functions are set by the upgrade key.

Hereinbelow, a description will be given to an example of providing sale of an upgrade key and an operation management service for a wireless apparatus by use of the Internet.

There are four types of upgrade keys: 1) a key which designates a capacity and a redundancy function; 2) a communication capacity varying key which determines whether a communication capacity is fixedly set or enabled to be freely set; 3) a LAN key which determines whether a LAN interface is made valid or invalid; and 4) an XPIC valid/invalid key which determines whether an XPIC function is made valid or invalid.

FIGS. 2 and 3 show the types of upgrade keys. The upgrade key is a data file which is constituted by six types of parameters, i.e., a type (any one of the above four types) of a key designated by a key, a production number of a wireless apparatus to which the key is input, a serial number of the upgrade key, information before change, whether the information before change is inspected or not, and whether the apparatus production number is checked or not. In the data file, information is encoded, and an encoded code is written.

Up to four upgrade keys are downloaded on one apparatus.

An upgrade key is associated with a production number of a specific wireless apparatus, and only the corresponding specific wireless apparatus becomes valid. However, it is also possible to generate a key which is not especially associated with a production number.

The serial number of the upgrade key is a unique number added in generation of the upgrade key. When the serial number is illegally copied and used, the number is automatically detected by an upgrade key serial number check function of the NMS.

FIG. 4 shows a functional configuration of an upgrade key support center apparatus, and FIG. 5 shows a functional block diagram including the NMS.

Referring to FIG. 4, reference numeral 2-1 denotes a Web interface function which processes a Web interface with a customer such that a customer ID and a password are checked or a menu is displayed; 2-2 denotes a function which performs an electronic mail service with the customer and which is required in each scene of a support service; 2-3 denotes a function which manages a delivered apparatus and upgrade key information; 2-4 denotes a function which downloads an upgrade key; 2-5 denotes a management function for a price table and a contract type of each customer; 2-6 denotes an acceptance/production designating function for an order of an upgrade key; 2-7 denotes an inquiry response service function; 2-8 denotes a service function which keeps an upgrade key until a customer receives the upgrade key by the Web; 7 denotes a section which manufactures a wireless apparatus; 8 denotes a section which generates an upgrade key; 9 denotes a section which performs maintenance and repair; 4-1 denotes an electronic mail function to transmit wireless apparatus information to the upgrade key support center apparatus; 4-2 denotes a wireless apparatus information collection/management function which collects and manages wireless apparatus information; and 4-3 denotes an upgrade key serial number check function which checks a serial number of an upgrade key.

An operation of the embodiment will be described below with reference to the drawings.

As an assumption, there are two types of upgrade key selling methods, i.e., sale by independent designation and sale by an frame-type contract. An frame-type contract sets a period as one year and determines the number and the type of upgrade keys. As a result, four types of combinations are obtained. More specifically, the combinations include: 1) limited number of upgrade keys and limited types of upgrade keys; 2) limited number and free type; 3) free number and limited type; and 4) free number and free type.

Embodiment 1

Independent Contract

Figure 6:
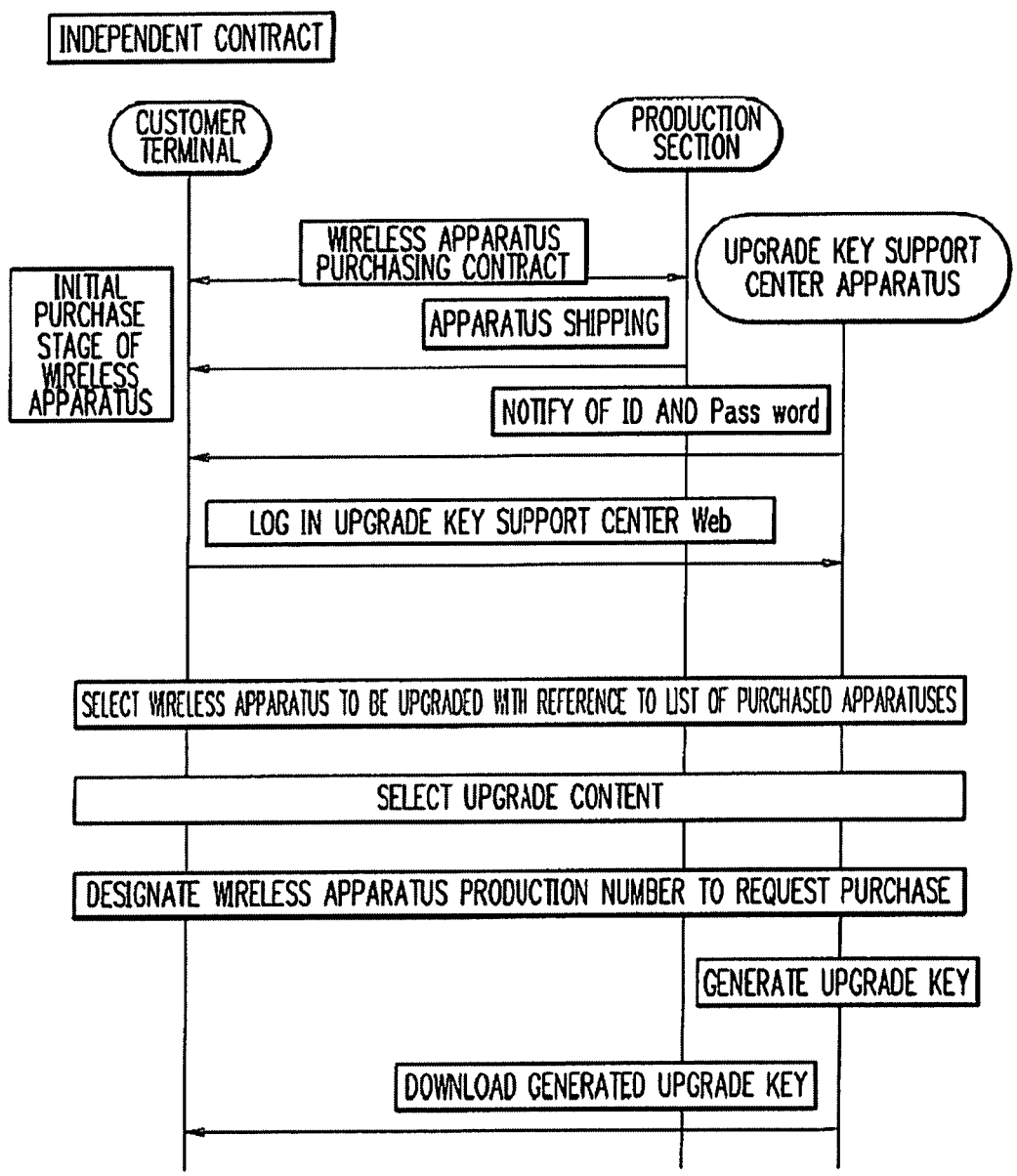
FIG. 6 is a chart showing a flow of a case in which upgrade keys are independently sold according to the embodiment of the invention.

Referring to a flow in FIG. 6 in a case where an upgrade key is independently sold, a service providing procedure is as follows.

First, 1) a user ID code and a password to log in the upgrade support key center apparatus are provided to a customer when an upgrade-key-corresponding wireless apparatus is delivered for the first time.

Next, 2) the customer logs in a designated Web by using the received ID code and password to receive various services.

Contents of main services include: 1. a list of purchased wireless apparatuses is seen; 2. a price list of upgrade keys is seen; 3. purchase is requested; 4. inquiry about an unclear point is made; 5, a purchased upgrade key is stored for a certain period of time; and 6, a purchased upgrade key is selected and downloaded.

In selection of an upgrade key (selection of a capacity and a redundant configuration), as shown in FIG. 7, information such as a necessary key, an interface card, and a price are obtained by selecting an intersection point of a matrix, wherein current key information and desired states after change are displayed in a left column and an upper row, respectively. By using the delivered apparatus information, a matrix displays a button enabling selection of only a portion of an upgrade key which is purchased by a customer to make selection easy and to prevent erroneous purchase.

A purchase is made through a Web or, as usual, a contract may also be made through a sales counter.

A reissue procedure is easily performed.

Embodiment 2

Service Provision in Frame-Type Contract

A service flow in frame-type contract is shown in FIG. 8.

2-1) A one-year frame-type contract in limited number and limited type is made. In this contract, keys designated in contact are downloaded from a Web up to the maximum number designated in contract.

2-2) A one-year frame-type contract in limited number and free type is made. In this contract, arbitrary keys are downloaded up to the maximum number designated in contract.

2-3) A one-year frame-type contract in free number and free type is made. In this contract, keys designated in contract, the number of which is not limited, are downloaded from a Web.

2-4) A one-year frame-type contract in free number and free type is made. In this contract, arbitrary keys (free type), the number of which is not limited (free number), are downloaded from a Web.

Figure 9:
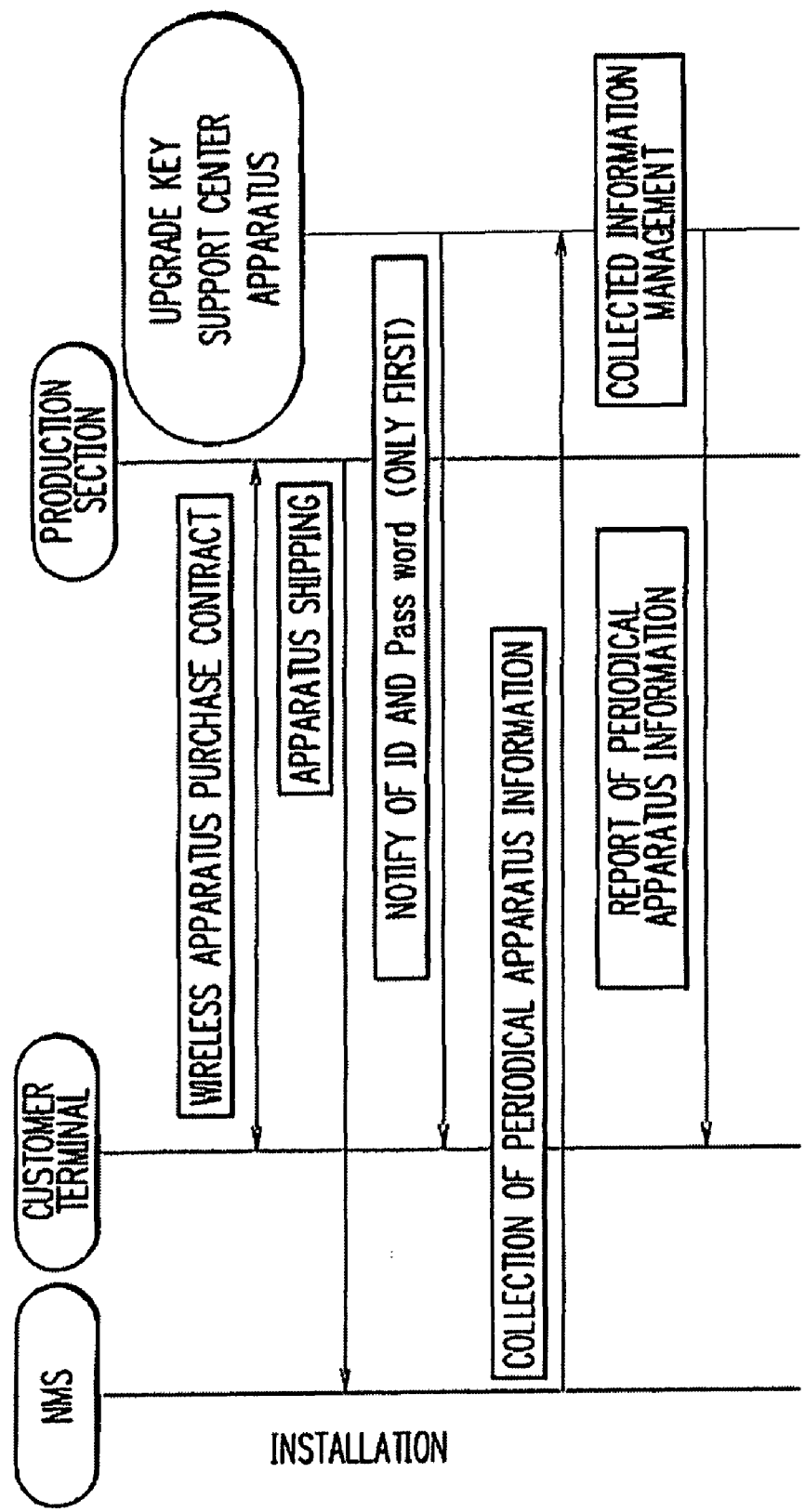
FIG. 9 is a chart showing a flow in which wireless apparatus is received from the NMS according to the embodiment of the invention.

As for service provision integrated with the NMS, FIG. 5 shows a functional configuration, and FIG. 9 shows a flow of receiving wireless apparatus information from the NMS.

A wireless apparatus information collection function, a wireless apparatus management function, and an electron mail function for communication with the upgrade key support center apparatus which are included in the NMS are used to acquire management information from the wireless apparatus operated by a customer periodically, and to make it possible to provide a total management service.

According to this embodiment, purchase of an upgrade key and a download service of the upgrade key are provided through a Web. A contract having a free form in which the type of the upgrade key is not limited is made. A commercial transaction is performed for each customer under an independent condition. It is also possible to provide an equipment management service of a customer purchased apparatus and an upgrade key storage service.

Furthermore, the following effects are obtained.

1) It is possible to provide a management service of a wireless apparatus corresponding to a delivered upgrade key. Conventionally, the wireless apparatus of this type is outrightly sold, and a management service after shipping (delivery) is not provided. However, a customer code, an apparatus production number, and an upgrade key product code are added to a shipping management DB and managed to make it possible to provide a management service for the wireless apparatus corresponding to the delivered upgrade key.

2) A customer can purchase/acquire an upgrade key through the Internet. An upgrade key service center from which an upgrade key is purchased/acquired is opened to make it possible to freely purchase/acquire an upgrade key anytime anywhere. A capacity and a redundancy of an upgrade key are easily selected by using a matrix display, which enables to simultaneously know module (interface card, modem card, and the like) information and price information which are necessary in association with each other.

3) A production number of a wireless apparatus required in purchase of an upgrade key is easily specified by managing delivered apparatus data in the shipping management DB.

4) A close support service is provided to each customer. An upgrade key support center apparatus is constructed which includes: (2-1) an upgrade key Web interface function; (2-2) an electronic mail function; (2-3) a delivered apparatus upgrade key information management function; (2-4) an upgrade key download function; (2-5) a per-customer price list and per-customer contract form management function; (2-6) an order acceptance/production designating function; (2-7) an inquiry corresponding service function; (2-8) an upgrade key storage function. This upgrade key support center apparatus enables provision of a close support service to a customer. In cooperation with the NMS, site operation state information is added to make it possible to provide a better service.

5) A production number of an apparatus required in purchase of an upgrade key is managed. Providing an equipment management service of a wireless apparatus corresponding to a delivered upgrade key allows a customer to easily select a production number of a purchased wireless apparatus and to easily purchase an upgrade key of the wireless apparatus.

6) A capacity and redundancy upgrade key are easily selected by using a matrix display screen by which before/after change is understood at a glance. Module (interface card, modem card, and the like) information and price information which are necessary in association with each other are also provided.

7) A delivered list, a price list, a service level, and a contract condition of each customer are displayed to enable provision of a close support service to each customer.

8) A life cycle management service for a wireless apparatus is provided. Managements are performed, such as estimation, purchase, an installation operation, a test, an operation, maintenance, repair, a change, and disposal, over a life cycle of the wireless apparatus. Further, a detailed service is provided in cooperation with the NMS.

The embodiments described above are preferred embodiments of the present invention. Various changes of the embodiments can be effected without departing from the spirit and scope of the invention. For example, a program to realize functions of a customer terminal, an upgrade key support center, and an NMS may be loaded on each of apparatuses and executed to perform a process of realizing the functions of the apparatuses. Furthermore, the program may be transmitted to other computer systems through a CD-ROM or a magneto-optical disk serving as a computer readable recording medium, through the Internet serving as a transmission medium, or with a transmitted wave through a telephone line.

The present invention can be widely applied to a business field which provides a sales/providing system for software, firmware, document, and a license, by using a Web or a service such as a sales/management service for pieces of electronic information which must be managed in units of customers and which can be provided by a Web.

An example of the effects of the present invention includes easy management of a wireless apparatus which can perform an increase/decrease in capacity, selection of redundancy, a change of functions, and the like by using an upgrade key.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An upgrade service method comprising:

downloading one or more upgrade keys including upgrade key content information specifying one or more of an increasing or decreasing of a communication capacity and a selection of communication redundancy, the upgrade key content information further specifying one or more of a selection of a first function determining whether the communication capacity is fixedly set or permitted to be freely set, a selection of a second function determining whether a local-area network (LAN) is valid or invalid, and a selection of a third function determining whether a cross-polarization interference cancellation (XPIC) function is invalid or valid the first, second, and third functions being of or for a wireless apparatus and regarding wireless communication for upgrading one or more of the first, second, and third functions of the wireless apparatus, the one or more upgrade keys generated from a production number of a wireless apparatus through a server to perform upgrading;

acquiring apparatus information of the wireless apparatus; and, collating the one or more upgrade keys with an upgrade key database in which the production number of the wireless apparatus and the one or more upgrade keys are stored in association with each other to thereby monitor whether an illegal upgrade is performed or not.

* * * * *